(12) United States Patent
Steinberger

(10) Patent No.: US 10,998,699 B2
(45) Date of Patent: May 4, 2021

(54) METHOD AND SYSTEM FOR CONFIGURING A SWITCH CABINET

(71) Applicant: Woehner GmbH & Co., KG Elektrotechnische Systeme, Roedental (DE)

(72) Inventor: Philipp Steinberger, Coburg (DE)

(73) Assignees: WOEHNER GMBH & CO., Roedental (DE); KG ELEKTROTECHNISCHE SYSTEME, Roedental (DE)

( * ) Notice: Subject to any disclaimer, the term of this patent is extended or adjusted under 35 U.S.C. 154(b) by 0 days.

(21) Appl. No.: 16/096,763

(22) PCT Filed: Apr. 28, 2017

(86) PCT No.: PCT/EP2017/060253
§ 371 (c)(1),
(2) Date: Oct. 26, 2018

(87) PCT Pub. No.: WO2017/191059
PCT Pub. Date: Nov. 9, 2017

(65) Prior Publication Data
US 2019/0123524 A1   Apr. 25, 2019

(30) Foreign Application Priority Data

May 2, 2016   (EP) .................................. 16167937

(51) Int. Cl.
*G05B 19/02*      (2006.01)
*H02B 3/00*       (2006.01)
(Continued)

(52) U.S. Cl.
CPC ............. *H02B 3/00* (2013.01); *G05B 19/042* (2013.01); *G05B 19/108* (2013.01);
(Continued)

(58) Field of Classification Search
None
See application file for complete search history.

(56) References Cited

U.S. PATENT DOCUMENTS

| | | | |
|---|---|---|---|
| 4,807,161 A * | 2/1989 | Comfort | G01R 31/2637 702/121 |
| 8,115,335 B2 * | 2/2012 | Menas | G06F 1/26 307/11 |

(Continued)

FOREIGN PATENT DOCUMENTS

| | | |
|---|---|---|
| DE | 102008012122 A1 | 9/2009 |
| DE | 10315646 A1 | 11/2014 |

(Continued)

OTHER PUBLICATIONS

International Search Report corresponding to international application No. PCT/EP2017/060253, dated Jul. 17, 2017 (16 pages).

(Continued)

*Primary Examiner* — Courtney L Smith
(74) *Attorney, Agent, or Firm* — Maginot, Moore & Beck, LLP

(57) ABSTRACT

A configuration system for reconfiguring a switch cabinet includes a detection unit—which detects functional units of an electric circuit, which are mounted within a switch cabinet, by way of characteristic features of the functional units, which have unambiguous identification features which are read out by the detection unit. A configuration unit contains a processor, which determines an electric circuit diagram of the electric circuit on the basis of the functional units of the electric circuit which are detected by way of the characteristic features and automatically replaces the detected functional units of the determined circuit diagram with associated replacement functional units which are (Continued)

stored in a database. An output unit is provided for outputting the determined replacement functional units.

17 Claims, 9 Drawing Sheets

(51) Int. Cl.
    *G05B 19/418*     (2006.01)
    *G05B 19/10*     (2006.01)
    *G05B 19/042*     (2006.01)
    *G06K 9/00*     (2006.01)
    *H02B 1/28*     (2006.01)
    *H02B 1/56*     (2006.01)

(52) U.S. Cl.
    CPC ..... *G05B 19/4183* (2013.01); *G06K 9/00671* (2013.01); *H02B 1/28* (2013.01); *H02B 1/565* (2013.01); *G05B 2219/2639* (2013.01); *G05B 2219/32014* (2013.01); *Y02P 90/02* (2015.11)

(56) References Cited

U.S. PATENT DOCUMENTS

| | | | |
|---|---|---|---|
| 9,301,025 B2 * | 3/2016 | Kioski | H04Q 1/15 |
| 9,723,745 B2 * | 8/2017 | Qi | H05K 7/1489 |
| 2004/0083356 A1 * | 4/2004 | Chatterjee | G06F 9/526 713/1 |
| 2007/0121306 A1 * | 5/2007 | Moakes | H05K 7/1402 361/788 |
| 2010/0110645 A1 * | 5/2010 | Campini | G06F 13/4081 361/752 |

FOREIGN PATENT DOCUMENTS

| | | |
|---|---|---|
| DE | 202006000702 U1 | 4/2017 |
| DE | 2002007006824 A1 | 7/2017 |
| EP | 177487 A1 | 4/1986 |
| EP | 2031626 A1 | 3/2009 |
| EP | 2928033 A1 | 10/2015 |
| WO | 2015028978 A1 | 3/2015 |
| WO | WO-2015028978 A1 * | 3/2015 |

OTHER PUBLICATIONS

Nakagawa, Takashi, et al., "Plant Maintenance Support System by Augmented Reality," Systems, Man and Cybernetics, 1999, IEEE (6 pages).

* cited by examiner

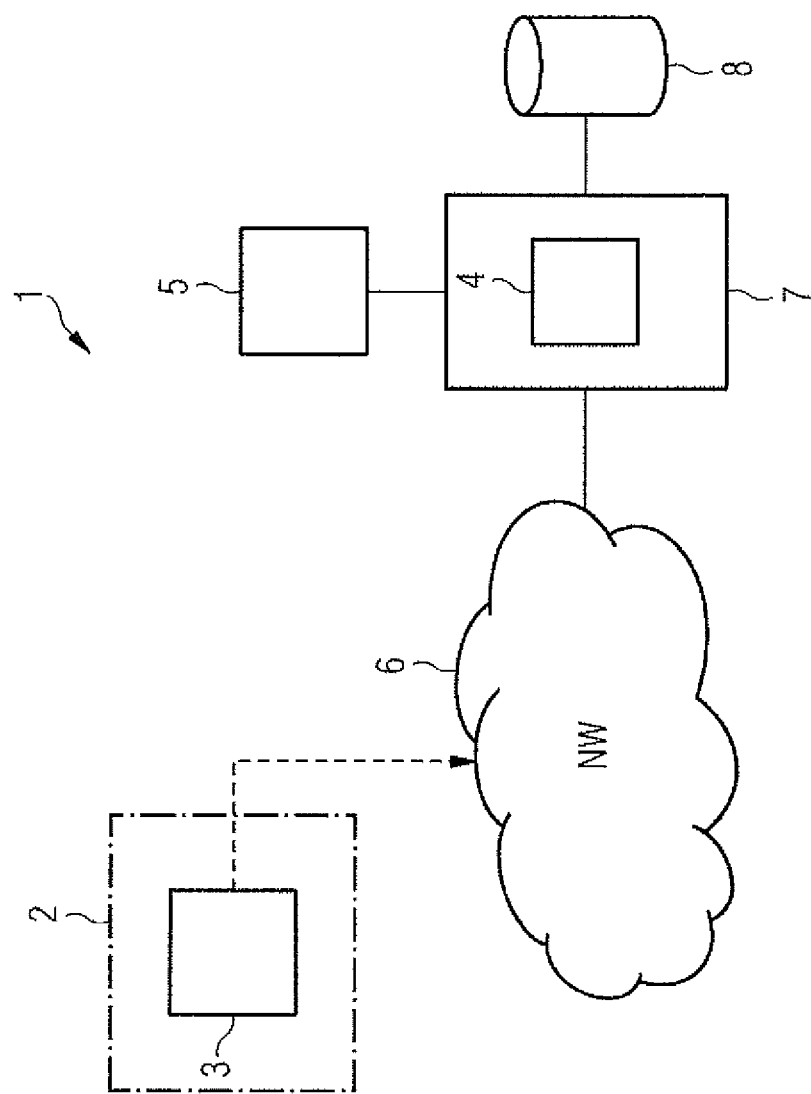
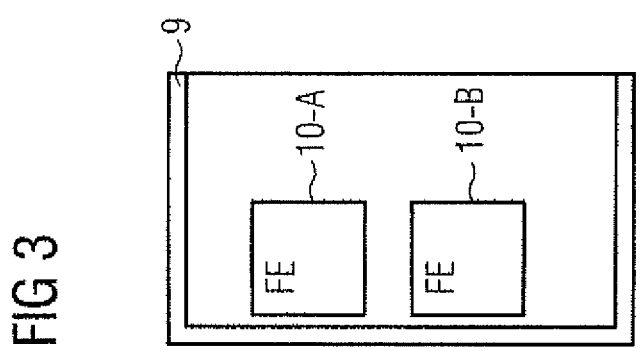
FIG 3

10C  10D

METHOD AND SYSTEM FOR CONFIGURING A SWITCH CABINET

This application is a 35 U.S.C. 371 National Stage application of PCT/EP2017/060253, filed Apr. 28, 2017, and claims priority to European Application No. EP 116167937.8, filed on May 2, 2016. The entire contents of the above-mentioned patent applications are incorporated herein by reference as part of the disclosure of this U.S. application.

BACKGROUND

A switch cabinet may contain various functional units of an electric circuit. The switch cabinet accommodates electrical and/or electronic functional units of the electric circuit. The electric circuit may form part of a process system or of a production device.

Depending on the application, switch cabinets have a housing, which may consist of plastics material or sheet metal, for receiving the functional units. The various production units or components located within the switch cabinet are interconnected, for example by terminals or terminal strips. Switch cabinets which have in the interior thereof functional units carrying relatively high voltages additionally have a lockable switch cabinet door. The size and construction of switch cabinets may vary depending on the user and the manufacturer. Depending on the application, the functional units of the implemented electric circuit which are mounted in the switch cabinet also vary. These functional units may originate from different manufacturers, and so for a complex electrical circuit a large number of different functional units may be interconnected within the switch cabinet. In conventional switch cabinets, there is a need to extend the electric circuit implemented therein with further functions or to replace functional units mounted in the switch cabinet. A functional unit is replaced for example if the previous functional unit cannot provide some functions or if the functional unit in question is defective. In many applications, it is necessary to reconfigure an existing switch cabinet so as to meet particular requirements, for example performance requirements or safety requirements. In conventional switch cabinets, the switch cabinet can be configured only with considerable effort. Usually, the existing switch cabinet is inspected by a technician so as to identify the functional units mounted therein and to determine how the functional units are interconnected by way of a circuit diagram which may be present. Once the circuit implemented in the electric switch cabinet has been determined, a technician manually replaces at least some of the functional units present with more suitable replacement functional units and creates a corresponding circuit and mounting diagram for the new, reconfigured switch cabinet. This process is extremely time-consuming and error-prone. In addition, the reconfiguration can only be carried out by an employee who is able to read electric circuit diagrams and, from technical data for defective or outdated functional units, to determine corresponding suitable replacement functional units which in addition are suitable or compatible with other existing functional units of the switch cabinet.

SUMMARY OF THE DISCLOSURE

Therefore, the object of the present invention is to provide a method and a system for configuring a switch cabinet which facilitate configuring the switch cabinet and prevent or reduce errors in configuring the switch cabinet.

The invention accordingly provides a configuration system for configuring a switch cabinet comprising:
a detection unit for detecting functional units of an electric circuit which are mounted within a switch cabinet,
a configuration unit, which determines an electric circuit diagram of the electric circuit on the basis of the detected functional units of the electric circuit and automatically replaces the detected functional units of the determined circuit diagram at least in part with replacement functional units, and
an output unit for outputting the detected replacement functional units.

In one possible embodiment of the configuration system according to the invention, the configuration unit has access, via a first interface, to a database which stores functional units and associated replacement functional units as well as various types of switch cabinets.

In a further possible embodiment of the configuration system according to the invention, the detection unit of the configuration system detects a functional unit mounted within the switch cabinet by way of at least one characteristic feature of the functional unit.

In one possible embodiment of the configuration system, the detection unit of the configuration system detects, as a characteristic feature of the functional unit, an unambiguous identification feature of the functional unit which is read out from the functional unit.

In a further possible embodiment of the configuration system according to the invention, the detection unit of the configuration system detects an external design feature of the functional unit as a characteristic feature of the functional unit.

In a further possible embodiment of the configuration system according to the invention, the detection unit of the configuration system automatically detects a type of the switch cabinet by way of at least one characteristic feature of the switch cabinet.

In a further possible embodiment of the configuration system according to the invention, the configuration unit of the configuration system automatically replaces functional units of the determined circuit diagram of the electric circuit at least in part with associated replacement functional units stored in a database to correct errors in and/or to optimize the switch cabinet in terms of at least one optimization criterion.

In a further possible embodiment of the configuration system according to the invention, the optimization criterion used in the automatic optimization comprises:
a required installation space of the replacement functional units within the switch cabinet,
a development of heat by the replacement functional units within the switch cabinet,
a dissipation of heat by the replacement functional units and whether the replacement functional units meet a predetermined certification requirement and/or
whether the replacement functional units meet a predetermined performance requirement.

In a further possible embodiment of the configuration system according to the invention, the configuration unit of the configuration system has access, via an interface, to data memories of the functional units mounted in the switch cabinet and/or to a data memory of the switch cabinet.

In one possible embodiment of the configuration system according to the invention, the data memory of a functional unit has identification data for identifying the functional unit in question and/or technical data for describing technical properties of the functional unit in question and/or state data for describing a current state of the functional unit in question and/or measurement data generated by the functional unit in question.

In a further possible embodiment of the configuration system according to the invention, the data memory of the switch cabinet has identification data for identifying the switch cabinet and/or technical data for describing technical properties of the switch cabinet and/or state data for describing a current state of the switch cabinet in question and/or measurement data generated by a functional unit of the switch cabinet.

In a further possible embodiment of the configuration system according to the invention, the detection unit, the configuration unit and/or the output unit are integrated into a portable user device.

In a further possible embodiment of the configuration system according to the invention, the portable user device has a wireless interface for reading out data from data memories of the functional units mounted in the switch cabinet and/or from a data memory of the switch cabinet.

In a further possible embodiment of the configuration system according to the invention, the detection unit of the configuration system has at least one sensor for optically detecting the functional units mounted within the switch cabinet.

In a further possible embodiment of the configuration system according to the invention, the optical sensor supplies images of the functional units mounted in the switch cabinet to the configuration unit of the configuration system.

In a further possible embodiment of the configuration system according to the invention, the configuration system has a calculation unit, in particular a processor, which automatically calculates geometric dimensions of and/or distances between the functional units mounted in the switch cabinet on the basis of the images, obtained by the detection unit, of the functional units mounted within the switch cabinet.

In a further possible embodiment of the configuration system according to the invention, the output unit of the configuration system has a display which displays the detected replacement functional units together with the non-replaced previous functional units, projected in a virtually mounted state in the switch cabinet.

In a further possible embodiment of the configuration system according to the invention, the portable user device has three-dimensional glasses, comprising a display, as an output unit.

The invention accordingly provides a switch cabinet having functional units mounted therein, which each have at least one characteristic feature which is detectable by a detection unit of a configuration system according to the first aspect of the invention for configuring the switch cabinet.

In a further possible embodiment of the switch cabinet according to the invention, the switch cabinet has at least one characteristic feature which is detectable by the detection unit of the configuration system according to the first aspect of the invention for automatically determining a type of the switch cabinet.

In a further possible embodiment of the switch cabinet according to the invention, the switch cabinet has conductor rails and/or support rails on which various functional units of the electric circuit are mounted.

In one possible embodiment of the switch cabinet according to the invention, the functional units of the functional units mounted in the switch cabinet have in particular the following functional units:

functional units for supplying power to functional units of the switch cabinet or devices connected to the switch cabinet, functional units for ventilating or cooling functional units of the switch cabinet or devices connected to the switch cabinet, functional units for distributing power to functional units of the switch cabinet or devices connected to the switch cabinet, functional units for electrically protecting functional units of the switch cabinet or devices connected to the switch cabinet, functional units for generating measurement data of functional units of the switch cabinet or devices connected to the switch cabinet, functional units for monitoring functional units of the switch cabinet or devices connected to the switch cabinet, functional units for controlling and/or regulating functional units of the switch cabinet or devices connected to the switch cabinet, functional units for protection against fire or explosions and/or functional units for frequency inversion.

The invention accordingly provides a method for configuring a switch cabinet comprising the steps of:

detecting functional units of an electric circuit which are mounted within a switch cabinet, determining an electric circuit diagram of the electric circuit on the basis of the detected functional units of the electric circuit, replacing the detected functional units of the determined circuit diagram with replacement functional units, and outputting the detected replacement functional units.

DESCRIPTION OF THE DRAWINGS

Hereinafter, possible embodiments of the configuration system according to the invention and of the method according to the invention for configuring a switch cabinet are described in detail with reference to the accompanying drawings, in which:

FIG. 3 is a block diagram of a further example embodiment of a configuration system according to the invention;

DETAILED DESCRIPTION

Figure 1:
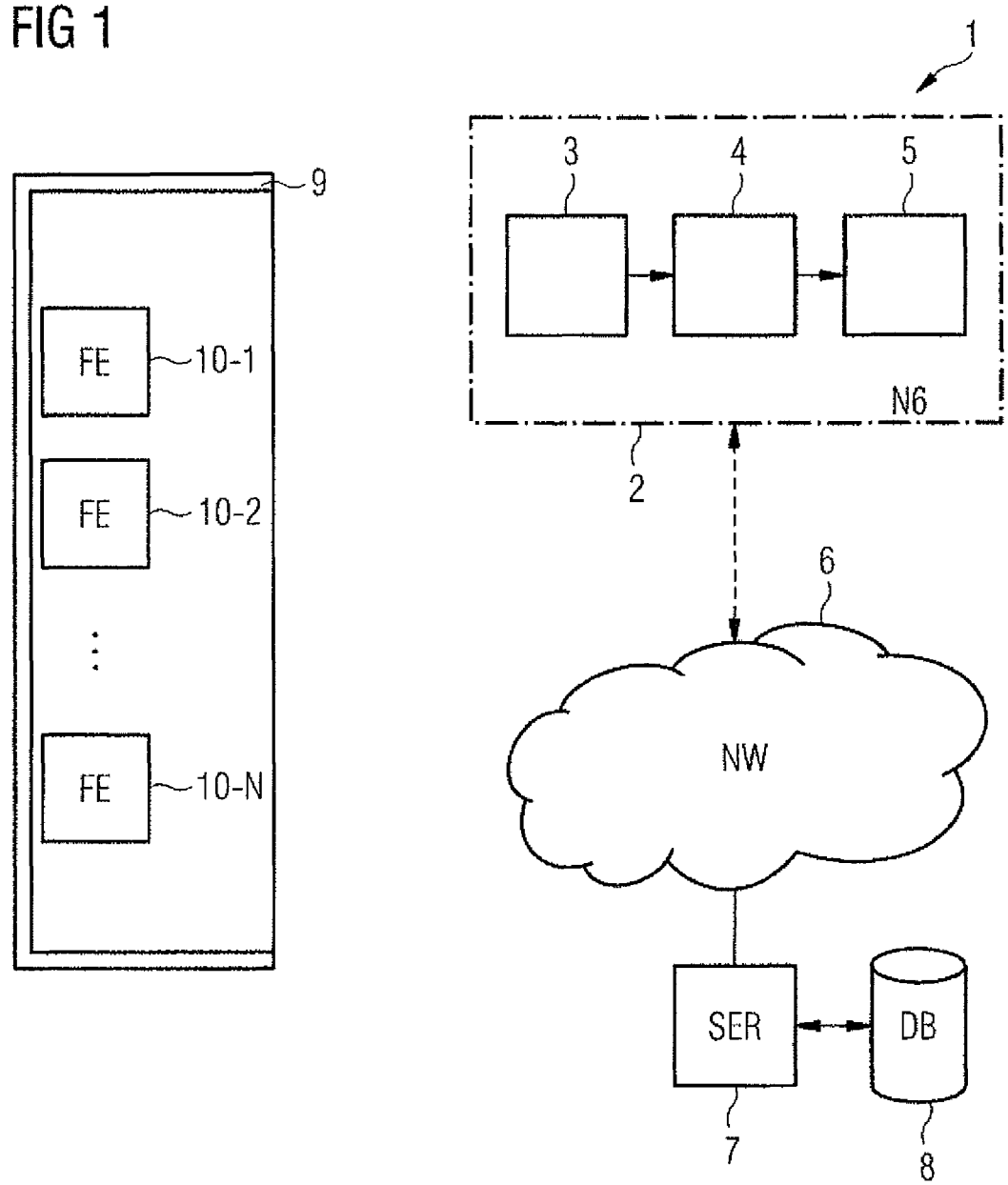
FIG. 1 is a block diagram illustrating an example embodiment of a configuration system according to the invention.

As can be seen from FIG. 1, in the embodiment shown in FIG. 1 a configuration system 1 according to the invention has a user device 2, which is preferably a portable user device. In the embodiment shown in FIG. 1, the configuration system 1 contains a detection unit 3, a configuration unit 4 and an output unit 5. In the embodiment shown in FIG. 1, the detection unit 3, the configuration unit 4 and the output unit 5 are integrated into the portable user device 2. In further embodiments, the configuration unit 4 and the output unit 5 may be implemented in a separate computer. In the embodiment shown in FIG. 1, the user device 2 has at least one interface with a network 6. A server 7 is connected to the network 6 and has access to a database 8.

A user who is carrying the user device 2 on his person can hold the detection unit 3 in front of a switch cabinet 9 in which various functional units 10-1, 10-2, 10-n are mounted. The functional units 10-i may comprise a wide range of types of functional units, in particular functional units for supplying power to other functional units within the switch cabinet or to other devices, for example motors, connected to the functional units 10-i of the switch cabinet 9. Further, the functional units 10-i may serve to ventilate or cool further functional units within the switch cabinet 9. Other functional units 10-i within the switch cabinet 9 serve to distribute or branch power within the switch cabinet or to distribute power to devices connected to the switch cabinet 9. Other functional units may for example serve for electrically protecting functional units or connected devices. Further, the switch cabinet 9 may have functional units 10-i which generate measurement data. Further, the switch cabinet 9 may have functional units 10-i for monitoring other functional units or for monitoring devices. A further type of functional units 10-i serves to control and/or regulate other functional units or devices. Further examples of functional units 10-i are functional units for protection against fire or explosions or functional units provided for frequency inversion.

The various types of functional units 10-i may be mounted on conductor rails, in particular busbars, and/or on support rails of the switch cabinet. The various types of functional units are interconnected to implement an electric circuit. The configuration unit 4 has access to the database 8 via the interface of the user device 2, via the network 6 and the server 7.

The detection unit 3 serves to detect functional units 10-i mounted within the switch cabinet 9 and the electric circuit implemented by the functional units. In one possible embodiment, the detection unit 3 detects a functional unit 10, mounted within the switch cabinet 9, of the implemented electric circuit by way of at least one characteristic feature of the functional unit 10.

In one possible embodiment, the characteristic feature of the functional unit 10 is an unambiguous identification feature, which can be read out on a memory of the functional unit 10 or is applied to the housing of the functional unit 10. In one possible embodiment, the characteristic feature is a manufacturer's serial number, product number or article number, which can be read out from a local data memory of the functional unit 10. In one possible embodiment, the identification feature of the functional unit 10 may be read out wirelessly from a memory via a wireless interface, for example via an NFC or Bluetooth interface. Alternatively, the identification feature may also be read out using RFID technology. In a further possible embodiment, a one-dimensional or two-dimensional bar code for identifying the functional unit 10 is applied to the housing of the functional unit 10. For example, at least part of the functional unit 10 has a QRC code applied to the associated housing of the functional unit 10. In one possible implementation, the detection unit 3 of the user device 2 is an optical sensor for detecting the optical code applied to the housing of the functional unit 10-i in each case.

In a further possible embodiment, the at least one characteristic feature of the functional unit 10 is an external design feature of the functional unit 10, for example a housing shape or housing colour of a housing of the functional unit 10.

In one possible embodiment, various characteristic features of the functional unit 10, in other words both identification features and design features, are made use of in combination so as unambiguously to detect or identify the relevant functional unit 10.

Figure 7A:
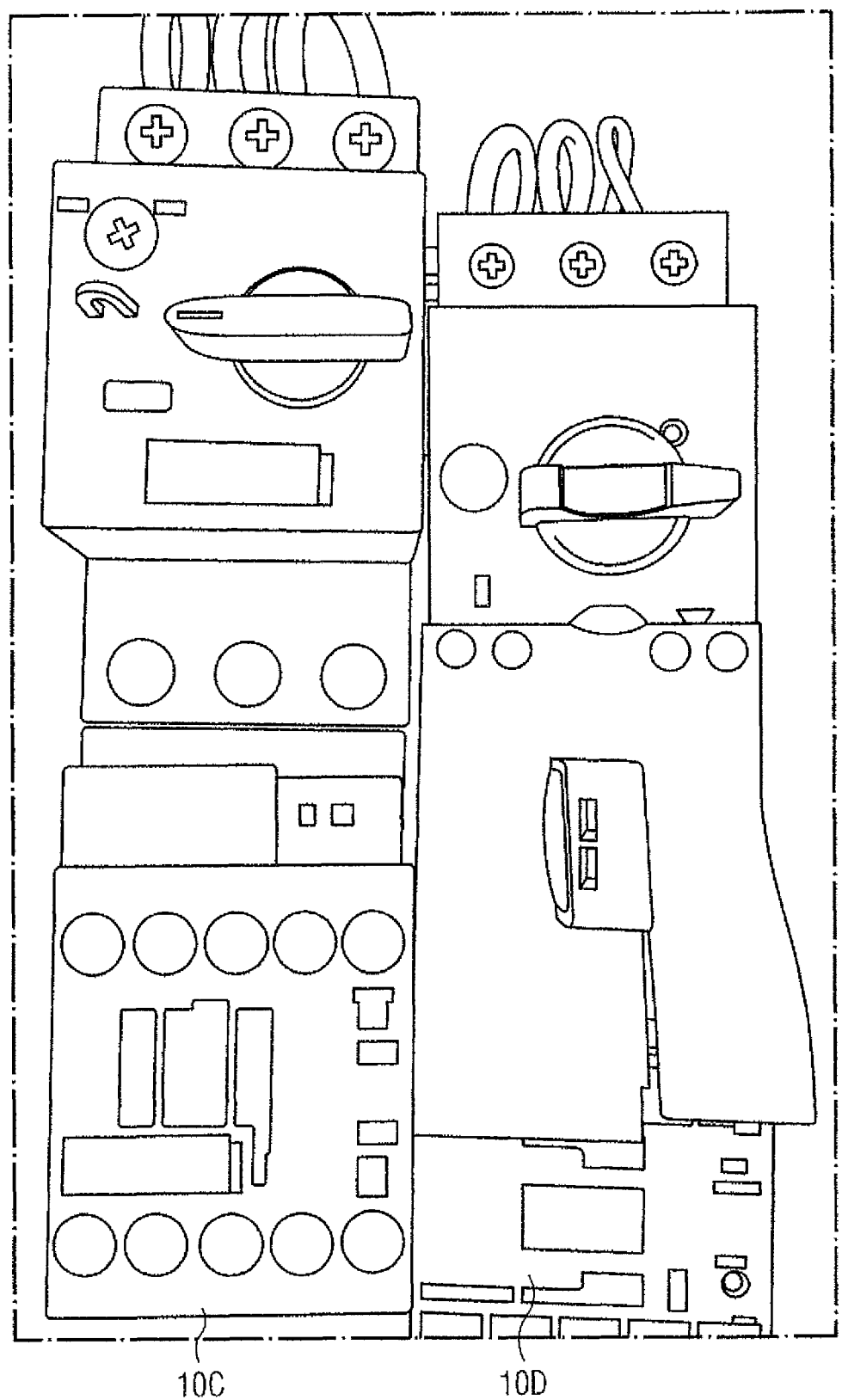
FIG. 7A, 7B show a specific example illustrating the reconfiguration of an electric circuit carried out by the configuration system according to the invention.

For example, in FIG. 7A, motor starters of various types are shown as functional units 10, and can be distinguished unambiguously simply by way of external design features. The shape, the colour and any product designations applied to the housing of the functional unit 10 make it possible unambiguously to identify the functional unit 10 in question or the motor starter. Further, the functional units 10-i may also have identification features which can be read out, for example stored product numbers, serial numbers or article numbers. Optical marks, for example brands or trademarks or logos, may also be made use of by the detection unit 3 for unambiguously identifying a functional unit 10 within the switch cabinet 9. The detection unit 3 is connected to the configuration unit 4. The configuration unit 4 has access to the database 8 via the interface. In the database 8, associated replacement functional units 11-i are stored for various functional units 10-i. Both the functional units 10-i and the associated replacement functional units 11-i may be placed in the database 8 by various manufacturers. In one possible embodiment, various switch cabinet types are further stored in the database 8 together with associated technical data.

Figure 5A:
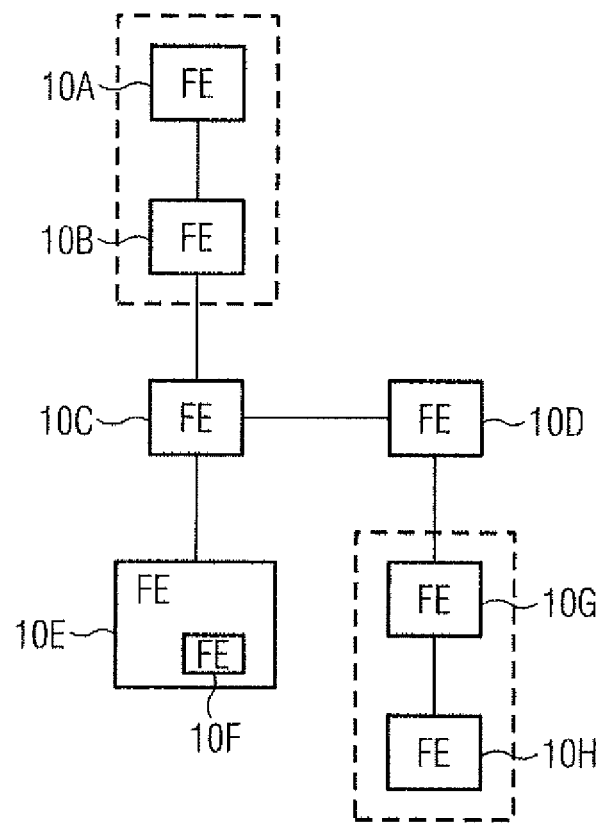
FIG. 5A, 5B show an example of a reconfigured electric circuit diagram for explaining the mode of operation of the method and system according to the invention for configuring a switch cabinet.
Figure 5B:
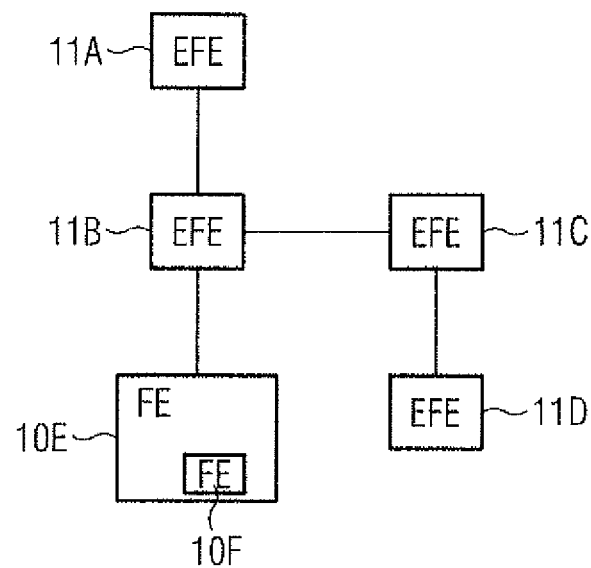

The configuration unit 4 preferably contains a determination unit or a processor, which automatically determines an electric circuit diagram of the electric circuit on the basis of the functional units 10, detected by way of the characteristic features, of the electric circuit implemented in the switch cabinet 9, as is shown schematically in FIG. 5A. As can be seen in FIG. 5A, various functional units 10 are interconnected in a determined circuit diagram. After receiving a corresponding order, the determination unit of the configuration unit 4 automatically replaces the detected previous functional units 10 of the determined circuit diagram at least in part with replacement functional units 11. FIG. 5B schematically shows the electric circuit diagram after the replacement of various functional units 10. In the example shown in FIG. 5A, 5B, the two functional units 10A, 10B are replaced with the replacement functional unit 11A. Further, the functional units 10C, 10D are replaced with the replacement functional units 11B, 11C. Further, the two functional units 10G, 10H are replaced with the replacement functional unit 11D. In the example shown in FIG. 5A, 5B, the original functional unit 10E is not replaced by the configuration unit 4. The electric circuit implemented in the original switch cabinet 9, as shown and described in the circuit diagram of FIG. 5A, is reconfigured in accordance with FIG. 5B. In one possible variant embodiment, all previous functional units 10 are replaced with corresponding replacement functional units 11. In an alternative embodiment, only some of the previous functional units 10 are replaced with replacement functional units 11, for example if for some functional units no suitable replacement functional units are stored in the database 8. In one possible variant embodiment, the replacement functional units 11 are manufactured by a particular manufacturer who operates the configuration system 1.

In a preferred variant embodiment, the configuration unit 4 automatically replaces the functional units 10 of the determined circuit diagram at least in part with associated replacement functional units 11, which are stored in the database 8, to optimize the circuit implemented in the switch cabinet 9 in terms of at least one optimization criterion. The predetermined optimization criterion used for automatically optimizing the implemented circuit may for example be the required installation space within the switch cabinet 9. In one possible variant embodiment, a user can input at least one optimization criterion to the configuration unit 4 via a user interface. A further example of a usable optimization criterion is the heat generated within the switch cabinet 9. In this case, the optimization criterion involves minimizing the development of heat by the functional units 10 and replacement functional units 11 within the switch cabinet 9. A further example of a usable optimization criterion involves the heat dissipation of the generated heat out of the switch cabinet 9. In this case, the optimization involves passing as much heat as possible out of the switch cabinet 9 by way of the functional units 10 or replacement functional units 11. A further example of a used optimization criterion is whether predetermined certification requirements are met. In this case, replacement functional units 11 which meet a predetermined certification requirement are used to replace functional units 10. In a further possible embodiment, an optimization criterion involves the replacement functional units 11 meeting predetermined performance requirements and site requirements, for example network frequency parameters. Further, the suggested replacement functional units 11 have to be compatible with one another and with the non-replaced previous functional units 10 at the interfaces thereof to the previous functional units 10. In the determination of the electric circuit diagram, shown in FIG. 5A, 5B, the determination unit of the configuration unit 4 therefore preferably carries out a compatibility check between the various functional units 10 or replacement functional units 11 using technical data stored in data memories 12. Only mutually compatible functional units 10 and replacement functional units 11 form part of the reconfigured electric circuit diagram shown in FIG. 5B.

In one possible implementation, for each functional unit 10 and associated replacement functional unit 11 a data model is saved in the database 8, in particular an object-orientated data model having correspondingly configurable ports which are automatically connectable to ports of other functional units 10 or replacement functional units 11. In one possible embodiment, a user can have the data model which is saved in the database 8 outputted or displayed via an interface. In one possible embodiment, the data models of the functional units 10 and/or replacement functional units 11 can be downloaded from servers of the various manufacturers of the functional units 10 and/or replacement functional units 11 and stored in a central database 8. In one possible embodiment, the user has the option of creating or adapting an associated data model or data object for a particular functional unit 10 using an editor and assigning or allocating data objects of suitable replacement functional units 11 thereto.

In one possible embodiment, the replacement functional units 11 determined by the configuration unit 4 are outputted to a user by the output unit 5 of the user device 2. Further, the determined replacement functional units 11 may also be outputted via an output unit which is present at a PC or computer and is located elsewhere, for example at a production site for functional units.

In one possible embodiment, the detection unit 3 has a sensor for optically capturing the various functional units 10 mounted within the switch cabinet 9, the detection unit 3 supplying or transmitting images, in particular camera images, of the functional units 10 mounted in the switch cabinet 9 to the configuration unit 4.

In one possible embodiment, the configuration unit 4 has a calculation unit which automatically calculates the geometric dimensions of and/or distances between the connected functional units 10 mounted within the switch cabinet 9 on the basis of the images, obtained by the detection unit 3, of the functional units 10 mounted within the switch cabinet 9. For example, the distance between the user device 2 and the switch cabinet 9 is automatically measured and the measured distance is taken into account in the calculation of the geometric dimensions of and/or distances between the functional units 10 mounted within the switch cabinet 9. The distances and geometric dimensions determined in this manner are evaluated in the optimization of the circuit mounted within the switch cabinet 9 in terms of the optimization criterion of installation space.

Figure 7B:
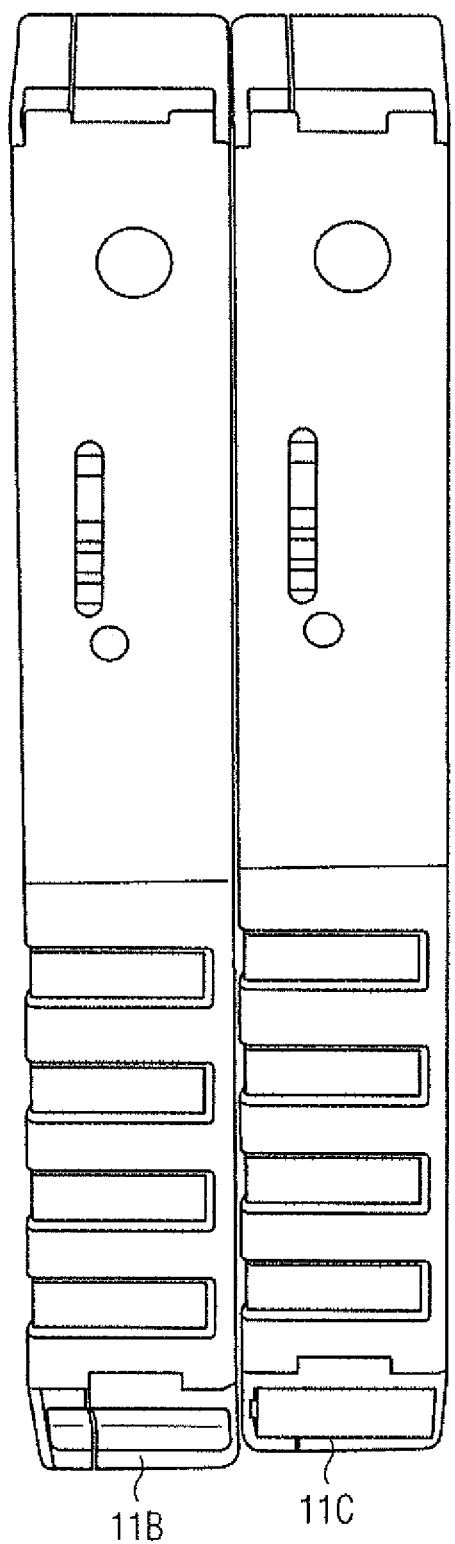

In a further possible embodiment of the configuration system 1 according to the invention, the output unit 5 has a display. In one possible embodiment, the determined replacement functional units 11 are displayed together with the non-replaced previous functional units 10 of the switch cabinet 9, projected in a virtually mounted state in the switch cabinet, in such a way that a user can gain a direct impression of the connection state of the switch cabinet 9 after the reconfiguration. For example, FIG. 7A, 7B show the connection of motor starts as functional units 10 within a switch cabinet 9. FIG. 7A shows the connection with original functional units 10C, 10D which are replaced by replacement functional units 11B, 11C. In this case, in one possible embodiment the replacement functional units 11B, 11C are outputted for the user directly in a projection of the switch cabinet 9. In one possible variant embodiment, the display of the output unit 5 is integrated into 3D glasses, which are worn by a user on-site. In an alternative embodiment, the user device 2 shown in FIG. 1 is a mobile telephone or a tablet comprising a display for displaying a circuit diagram comprising the determined replacement functional units 11.

In one possible variant embodiment of the configuration system 1 according to the invention, functional units 10 of the determined electric circuit diagram of the electric circuit implemented in the switch cabinet 9 are replaced incrementally. Initially, an electric circuit diagram of the electric circuit is determined by the determination unit of the configuration unit 4 and displayed to the technician via a display of the output unit 5. The technician thus has the option of selecting via a user interface, for example a graphical user interface GUI, one or more functional units 10 of the circuit diagram which he wishes or considers it necessary to replace. For example, in the example shown in FIG. 5A of a circuit diagram, the user can select the two functional units 10A, 10B and instruct the configuration unit 4 to replace the functional units 10A, 10B with one or more suitable replacement functional units 11. In this case, in one possible variant embodiment the user has the option of additionally making further specifications for this purpose, for example that the replacement functional units 11 have to meet a particular certification requirement for a particular technical standard. Further, the user has for example the option of selecting a manufacturer preferred by him of the replacement functional unit. Further, in one possible variant embodiment, one option for the user involves predetermining particular electrical parameters of the desired replacement functional unit, for example a required amperage or current level or the like. Using these state specifications, the configuration unit 4 subsequently searches within the database 8 for suitable replacement functional units 11 which are suitable for replacing the selected functional units 10A, 10B and for meeting the further specified requirements or optimization criteria. In the example shown in FIG. 5A, 5B, the replacement functional unit 11A is determined as a suitable replacement functional unit in the database 8. Thereupon, the previous functional units 10A, 10B are automatically replaced with the determined generated replacement functional unit 11A.

In a further special embodiment, the user or technician has the option of iteratively continuing the replacement process by for example attempting to replace one or more replacement functional units 11 in turn with suitable replacement functional units so as further to optimize the circuit, in particular for saving space within the switch cabinet 9.

In a further possible embodiment, when searching the database 8, the configuration unit 4 makes various suggestions to the user for replacing the functional units he selects, for example the functional units 10A, 10B. For example, the configuration unit 4 can output to the user, via the output unit 5, various suitable replacement functional units 11A from various manufacturers along with associated technical information data, and the user subsequently has the option to select one of the suggested replacement functional units 11A. In one possible embodiment, the replacement process thus takes place iteratively and/or interactively with a user, the original circuit being reconfigured incrementally in accordance with the circuit diagram until the electric circuit has been optimized.

Figure 6B:
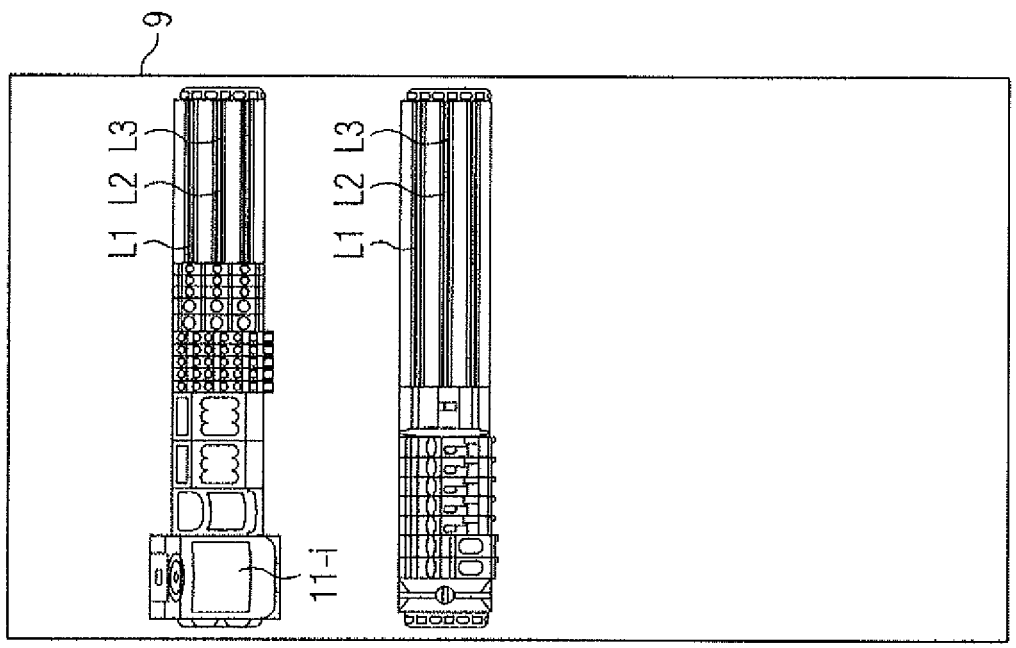
FIG. 6A, 6B shows a possible example of the reconfiguration of a switch cabinet using a configuration system according to the invention.
Figure 6A:
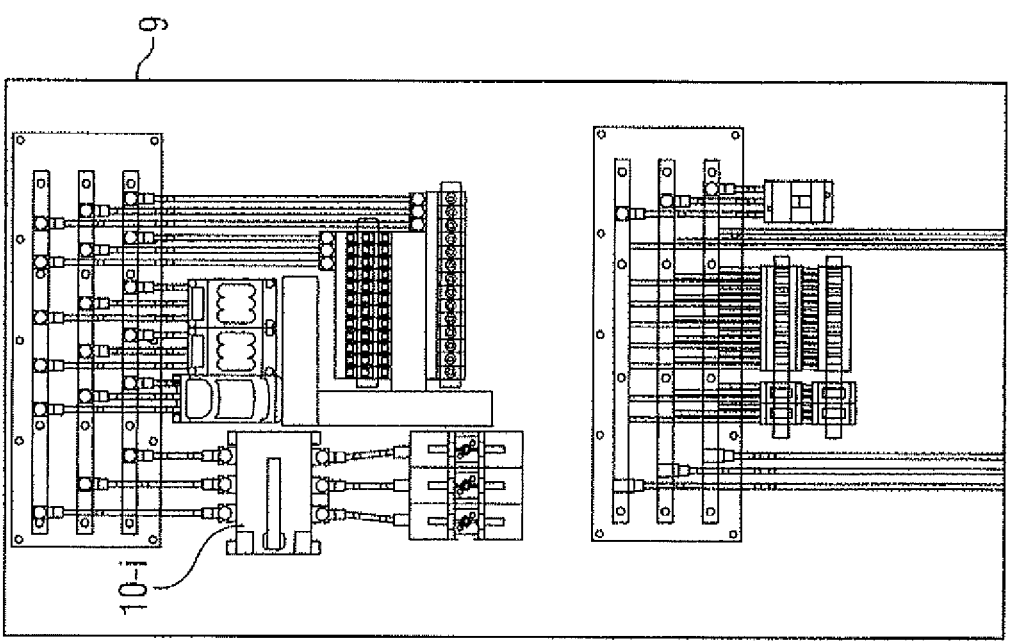

FIG. 6A, 6B show an example of the reconfiguration of an electric circuit within a switch cabinet 9 by means of the configuration system 1 according to the invention. FIG. 6A shows an example of a complex electric circuit which is implemented in a switch cabinet 9 and in which a plurality of different functional units 10 are interconnected via rails and splitters or terminals. After the reconfiguration, the circuit diagram shown in FIG. 6B occurs. In the example shown, all functional units or replacement functional units are located on parallel busbars L1, L2, L3. The replacement functional units 11-$i$ provided on the busbars L1, L2, L3 meet the functional requirements of the configurator and simultaneously form the electric circuits as they are connected in the switch cabinet 9 which is originally already present. As can be seen from FIG. 6A, 6B, by reconfiguring the previous electric circuit considerable space can be saved within the switch cabinet 9. Further, the functional units or replacement functional units are arranged much more clearly in the circuit of FIG. 6B, and so wiring and/or handling errors in the operation of the switch cabinet 9 are reduced. The reconfiguration of the electric circuit FIG. 6A to produce the electric circuit shown in FIG. 6B is largely semi-automatic, for example interactive and/or iterative or incremental. The reconfigured circuit shown in FIG. 6B thus meets the requirements or optimization criteria inputted by the user. In one possible embodiment, the various functional units 10-$i$ shown in FIG. 6A are automatically detected by way of unambiguous characteristic features, in particular by way of identification features and/or external design features of the various functional units 10-$i$.

In a further possible embodiment, the type of the previously present physical switch cabinet 9 is also additionally automatically detected by way of a characteristic feature and taken into account in the reconfiguration or in the replacement process. In one possible variant embodiment, the configuration unit 4 can access the database 8 so as to read out various associated or suitable switch cabinet types. In one possible variant embodiment, the configuration unit 4 may also suggest another suitable switch cabinet which replaces the previous switch cabinet 9, the new switch cabinet generally having a smaller switching space so as to save space but still being capable of receiving all required replacement functional units 11-$i$.

Figure 2:
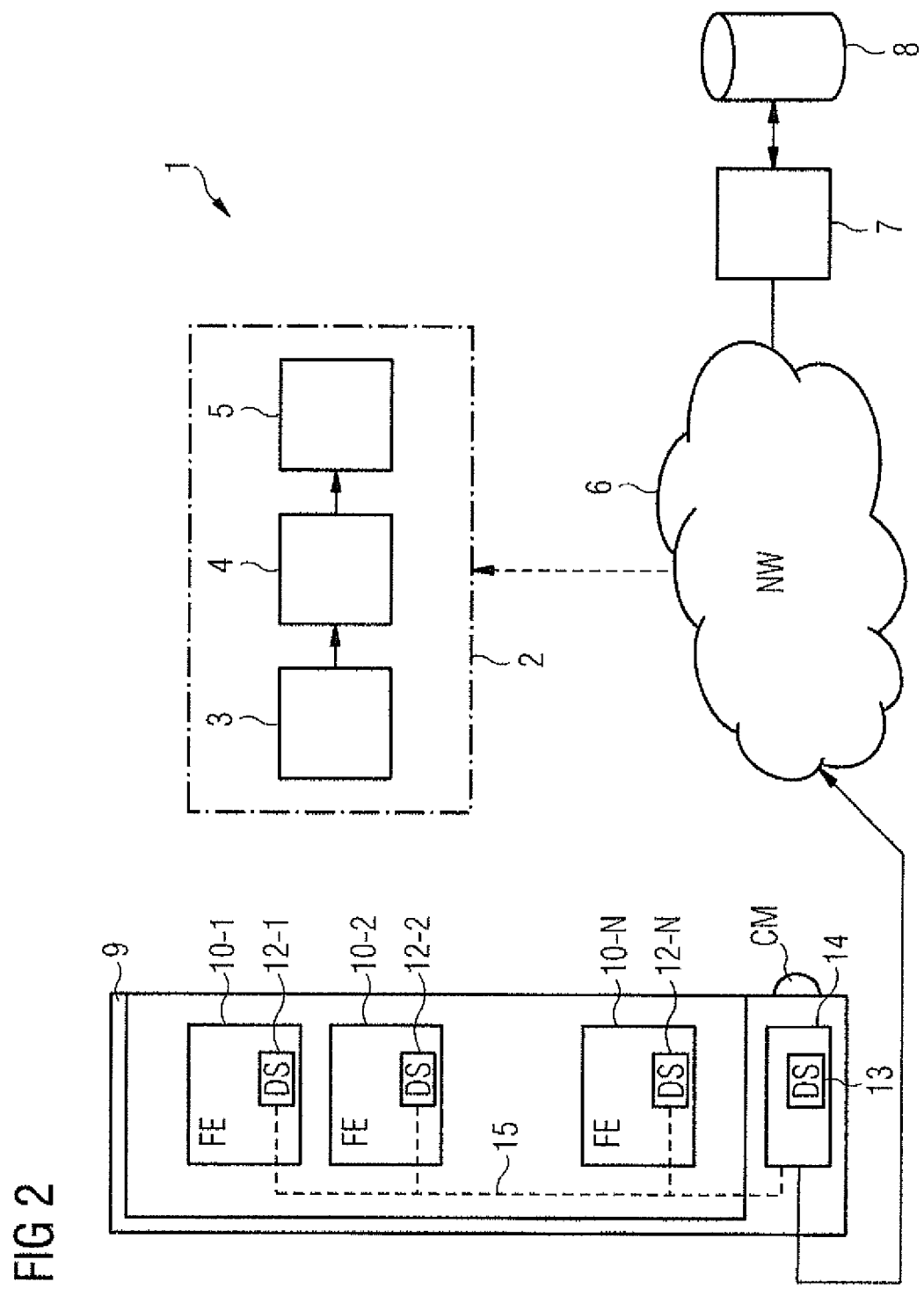
FIG. 2 is a further block diagram illustrating a further example embodiment of a configuration system according to the invention.

FIG. 2 shows a further possible embodiment of the configuration system 1 according to the invention. In the embodiment shown in FIG. 2, the configuration unit 4 has access, via a further wireless interface, to the data memories 12-$i$, which may be provided in the functional units 10-$i$ mounted on support rails or conductor rails. Further, the configuration unit 4 may have access to a data memory 13 of a functional unit 14 which is integrated within the switch cabinet 9 and which has a data interface with the data network 6. In one possible variant embodiment, the various data memories of the functional units 10-$i$ may be connected to the functional unit 14 of the switch cabinet 9 via a data bus 15, it being possible for data which are stored within the various data memories 12-$i$ to be transmitted to the data memory 13 of the switch cabinet 9 automatically via the data bus 15. In the embodiment shown, the switch cabinet 9 has at least one characteristic feature CM which makes it possible to identify the switch cabinet 9. Identification data for identifying each functional unit, technical data for describing technical properties of each functional unit, state data for describing a current state of the functional unit and measurement data generated by each functional unit during operation of the circuit may be stored in the various data memories 12-$i$ of the functional units 10-$i$. In a corresponding manner, the data memory 13 of the switch cabinet 9 may contain identification data for identifying the switch cabinet 9 and/or technical data for describing technical properties of the switch cabinet 9, state data for describing a current state of the switch cabinet 9 and measurement data generated by the switch cabinet 9 during operation of the circuit. Correspondingly, the data memory 13 of the switch cabinet 9 may contain identification data for identifying the switch cabinet 9 and/or technical data for describing technical properties of the switch cabinet 9, state data for describing a current operating state of the switch cabinet 9 and measurement data generated by a functional unit of the switch cabinet 9.

In one possible embodiment, the detection unit 3 of the configuration system 1 may read out, via the network 6, identification data from the data memories 12-$i$, 13 for identifying the switch cabinet 9 and/or the functional units connected therein, and identify the functional units 10-$i$ mounted in the switch cabinet 9 by way of the identification data. In the embodiment shown in FIG. 2, the detection unit 3 may additionally detect the functional units 10-$i$ connected in the switch cabinet and the absolute position or position relative to one another thereof within the switch cabinet 9 by way of characteristic features of the functional units 10-$i$ connected in the switch cabinet 9. For example, the detection unit 3 may determine position coordinates of the functional units 10-$i$ positioned in the switch cabinet 9 using a coordinate grid and supply these to the configuration unit 4 for reconfiguring the circuit. In one possible embodiment, the dimensioning, in other words the length L, width B and depth T, of the switch cabinet 9, are measured and a two- or three-dimensional coordinate grid is formed, position coordinates being assigned to the various detected functional units 10-$i$. For example, in this way it can be established that the functional unit 10-$i$ is located at coordinates x1, x2, x3 within the switch cabinet 9 and the functional unit 10-2 is located at position coordinates x2, y2, y3. In this way, it is possible to determine the spatial structure or physical connection of the functional units 10-$i$ within the switch cabinet 9 and take this into account in the reconfiguration of the circuit. As well as the coordinates or position coordinates of the various functional units 10-$i$, additional dimensions, in other words the length, width and height, of the various functional units within the coordinate grid can be determined and taken into account in the calculation by the configuration unit. For example, preferably functional units 10-$i$ of large volume or dimensions are replaced with replacement functional units 11-$i$ which take up a considerably smaller space. In the variant embodiment shown in FIG. 2, the information data, stored in the data memories 12, 13, of the various functional units 10-$i$ are read out via a data interface and the network 6. Alternatively, the various data memories may also be read out to the user device 2 directly via a wireless interface, for example by Bluetooth, NFC or RFID.

FIG. 3 shows a further embodiment of the configuration system 1 according to the invention.

In the embodiment shown in FIG. 3, the configuration unit 4 is located not within the portable user device 2, but within a computer or server 7, which is provided at the network 6 and has access to a database 8. In the embodiment shown in FIG. 3, the user device 2 merely has a detection unit 3 for detecting the functional units 10-$i$ of the electric circuit which are connected or mounted within the switch cabinet 9. The configuration unit 4 within the computer 7 determines an electric circuit diagram of the electric circuit implemented within the switch cabinet 9 on the basis of the detected functional units 10-$i$, which it receives from the detection unit 3 via the network 6. Subsequently, the detected functional units 10-$i$ for determining the circuit plan are automatically replaced at least in part with replacement functional units 11-$i$, which the configuration unit 4 reads out directly from the local database 8. The determined functional units 11-$i$ are outputted for a user via an output unit 5, provided at the computer 7, of the configuration system 1. Further, in a further variant embodiment, the determined replacement functional units 11-$i$ may be transmitted by the configuration unit 4 via the network 6 to an output unit 5 of the portable device 2 and displayed there to a user. In one possible variant embodiment, the portable device 2 is carried by a first user, on his person, who is located directly on site at the switch cabinet 9 to be reconfigured. Further, in one possible variant embodiment, the configuration unit 4 may be operated via a user interface by a second user who is located remotely from the switch cabinet 9 to be reconfigured. For example, the user located directly on site is an assembler, whilst the second user working at the computer 7 is an expert or engineer familiar with the switch cabinets. In the variant embodiment shown in FIG. 3, the first user records the configuration of the switch cabinet 9 on site and transmits it via the network 6 to the computer 7 of the switch cabinet expert. In one possible variant embodiment, the switch cabinet expert iteratively and interactively carries out the reconfiguration of the switch cabinet 9 incrementally, the various reconfiguration steps, in one possible variant embodiment, being visible or trackable for the assembler on site because they are displayed to the assembler via a display of the output unit 5 of the portable device 2. In one possible variant embodiment, the physical replacement of the various functional units 10-$i$ on site at the switch cabinet 9 may also take place incrementally, for example in that the assembler on site is instructed to replace the two previous functional units 10A, 10B with a replacement functional unit 11A in accordance with the example circuit diagram of FIG. 5B. In one possible variant embodiment, the incrementally changed circuit diagram is additionally displayed in a display of the output unit 5 of the portable user device 2, which is for example carried by an assembler on site, in such a way that the assembler can carry out required replacements of functional units 10-$i$ with replacement functional units 11-$i$ in a simple, error-free manner. The assembler can thus be instructed to implement required settings of functional parameters at functional units 10-$i$ and/or replacement functional units 11-$i$, so as for example to achieve compatibility of various functional units or replacement functional units with one another for the desired functionality. In a preferred embodiment, the communication between the technician or assembler on site at the switch cabinet 9 and the technician in the remotely located configuration centre at the computer 7 is assisted by voice control. In this case, a voice communication connection is established between the user terminal 2 and the computer 7 via the network 6, in such a way that the two technicians can converse audially during the configuration process or replacement process.

Figure 4:
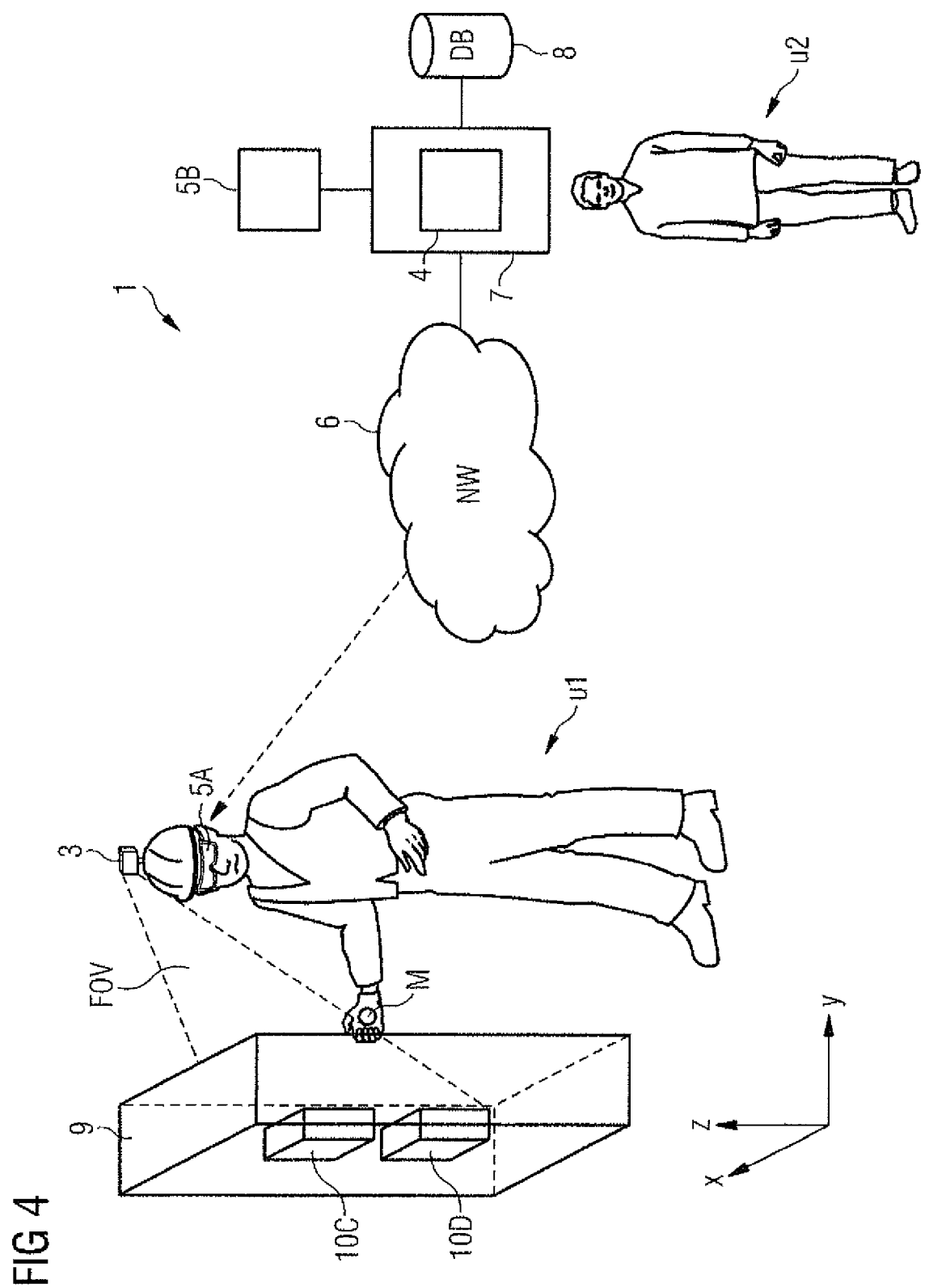
FIG. 4 is a schematic drawing of a further example embodiment of the configuration system according to the invention.

FIG. 4 shows a further embodiment of the configuration system 1 according to the invention. In the example shown, a user U1, for example an assembler, is located in the vicinity of a switch cabinet 9 to be reconfigured and is wearing a helmet on which a camera is mounted as a detection unit 3. The various functional units 10A, 10B within the switch cabinet 9 are located in the field of view FOV of the camera or detection unit 3. The camera 3 supplies a sequence of camera images via a network interface, in particular a wireless network interface, for example to an access point of the network 6, which passes on the camera images to a remotely located server or computer 7 of the configuration system 1. By means of the camera 3, the assembler U1 can take photos of the circuit mounted in the switch cabinet 9 from the front, from the rear and from the sides, the switch cabinet facings being dismountable. In the computer 7, a configuration unit 4 is provided, which can automatically determine or calculate an electric circuit diagram on the basis of the detected functional units 10 within the switch cabinet 9 and subsequently automatically replaces the detected functional units 10 of the determined circuit diagram at least in part with suitable replacement functional units 11 which the configuration unit 4 reads out from the central database 8. The determined replacement functional units 11 may be outputted by a local output unit 5B to a technician or user U2 who carries out the reconfiguration. The incrementally reconfigured circuit diagram, shown by way of example in FIG. 5B, is preferably displayed to both of the users or technicians U1, U2. In this context, the replacement functional units are preferably automatically shown superimposed on the real functional units mounted in the switch cabinet 9. In addition to his real perception, the user thus receives further additional information which is directly referenced to his visual perceptions. In this embodiment, this additional information comprises an optically superposed, for example reconfigured circuit diagram. In the scenario shown in FIG. 4, the assembler U1 may for example be instructed to replace the two functional units 10C, 10D with the replacement functional units 11B, 11C. In one possible variant configuration, the assembler U1 receives additional instructions on carrying out the replacement process or on mounting the determined replacement functional units 11B, 11C. For example, the assembler U1 receives information as to how he should electrically connect replacement functional units to previous functional units or to other replacement functional units and for example which assembly means he should use for this purpose. Further, after replacement has taken place, the assembler may be instructed to set the electric circuit in operation at least in part so as to check whether the replacement or connection has been carried out successfully.

Figure 8:
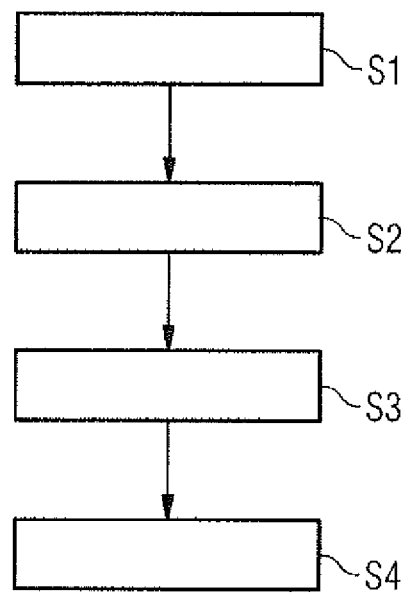
FIG. 8 is a flow chart illustrating an embodiment of the method according to the invention for configuring a switch cabinet.

FIG. 8 is a flow chart illustrating an embodiment of a method according to the invention for configuring a switch cabinet.

In a first step S1, functional units 10 of an electric circuit which are mounted within the switch cabinet 9 are detected.

In a further step S2, an electric circuit diagram of the electric circuit is determined on the basis of the detected functional units 10 of the electric circuit.

In a further step S3, the detected functional units of the determined circuit diagram are automatically replaced at least in part as suitable replacement functional units 11.

In a further step S4, the determined replacement functional units 11 are outputted.

As well as simple, error-free configuration of the switch cabinet 9, the system 1 according to the invention additionally makes preventative maintenance of the switch cabinet 9 possible.

By way of conveyed measurement or state data, it is possible centrally to identify functional units 10 which need to be maintained or replaced. Further, by means of the system 1 according to the invention, it is possible in the event of a failure or defect in functional units to carry out tracking within a switch cabinet 9 as to the place and time at which the defective functional units 10 were manufactured, for example so as to optimize a production process for manufacturing the functional units.

In one possible embodiment of the system according to the invention, various users or maintenance staff may each have a portable user device 2, these being connected via a network 6, for example the Internet, to a central server 7 of a manufacturer of switch cabinets and/or functional units. In this embodiment, a technician U2 of the manufacturer can communicate with various assemblers or maintenance persons U1 who maintain a large number of different switch cabinets 9 worldwide. The configuration system 1 may be used both for reconfiguring existing switch cabinets and for managing the range of functionality of the existing switch cabinet 9. Further, the system 1 according to the invention can be used for reconfiguring an existing switch cabinet 9. The system according to the invention further makes it possible for online documentation of the configuration processes undertaken to be carried out wirelessly at the manufacturer and customer. By way of the configuration system 1 according to the invention, in particular planning, dimensioning and wiring errors are largely prevented, in such a way that the reconfiguration of the switch cabinet 9 can be carried out in a substantially shorter time and more reliably.

In a possible further variant embodiment, by way of the reconfigured electric circuit diagram, using the replaced replacement functional units 11 a simulation can initially be carried out as to whether the reconfigured electric circuit satisfies particular technical properties. Only when the simulation has been carried out successfully using the reconfigured electric circuit diagram, for example the electric circuit diagram shown in FIG. 5B, is the replacement process for replacing the previous functional units carried out or indicated. In this case too, it is possible to proceed iteratively and interactively. A further advantage of the configuration system 1 is that the assemblers U1 deployed on site are effectively assisted by the remotely working experts U2 and thus in principle require a lower technical qualification. In further possible embodiments, replacement orders for required replacement functional units 11, which for example replace defective functional units 10 within the switch cabinet, are triggered automatically, meaning that the required replacement functional unit can be manufactured and/or transported automatically in a logistic chain.

In a further possible embodiment of the configuration system 1, the geographic data or location of the switch cabinet 9 and/or of the assembler located there are transmitted, in such a way that the sending of the required replacement functional unit 11 can be triggered and monitored automatically. In this context, in one possible embodiment the assembler U1 can track the progress of the delivery of the replacement functional unit and the expected delivery time. As a result, failure times can be reduced effectively if a switch cabinet 9 of a technical system fails. The configuration system 1 according to the invention thus reduces not only the required repair or replacement time, but also the delivery time for required replacement functional units 11. In one possible variant embodiment, the replacement functional unit 11 is identical in technical functionality to the functional unit 10 to be replaced, but does not have the observed defect. In a further possible variant embodiment, the assembler U1 on site can communicate via further communication channels with the manufacturer of the functional units, for example by e-mail or other means of communication. The interaction between the assembler U1 on site at the switch cabinet 9 and the technician U2 of the manufacturer preferably takes place almost in real time. The assembler U1 can be supplied in a targeted manner with additional information which gives him assistance in his maintenance or assembly work. In one possible embodiment, planning data are matched with existing numerical geometries or dimensions. In the embodiment shown in FIG. 4, the assembler U1 may for example carry semi-transparent data glasses as an output unit 5A. The additional information overlaid on the output unit 5A may comprise text, graphics, two-dimensional or three-dimensional objects, animations or videos.

In a further possible variant embodiment, during the assembly and/or maintenance process the switch cabinet 9 may be controlled and/or remotely monitored at the central computer 7 via the data interface, shown in FIG. 2, between the network 6 and the control system 14 of the switch cabinet 9. For example, by remote control, the technician U2 of the manufacturer can ensure during the assembly and/or maintenance process that the circuit implemented in the switch cabinet 9 is fully switched off, in such a way that the assembler U1 cannot touch any voltage-carrying functional units 10 or rails. This greatly increases the safety of the maintenance or repair process. Further, in one possible embodiment, the technician U2 of the central manufacturer can track the progress of a reconfiguration, maintenance or repair process by way of data received by the control system 14. For example, if the assembler U1 has set a functional parameter of a functional unit 10-$i$ or a replacement functional unit 11-$i$ incorrectly on site, the assembler U2 of the manufacturer can detect this at the server 7 by way of the receiving data, for example measurement data, and directly instruct the assembler U1 located on site to change or readjust the setting. In a further possible variant embodiment, the measurement data or the monitoring data are additionally transmitted to the output unit 5 of the user device 2 carried by the assembler U1. In this variant embodiment, the assembler U1 can thus himself directly control whether the changes he has made have been carried out correctly at the correct functional unit 10. For example, an assembler U1 may be instructed to set a functional parameter, for example a current level, to a particular target value, for example to 10 A. The assembler U1 implements the corresponding setting at the indicated functional unit 10-*i*, and receives measurement data, which display to him the current value he has actually set, from the control system 14 of the switch cabinet 9 via the data interface and the network 6. The assembler U1 can subsequently readjust the setting until the measurement data correspond to the predetermined target value. Alternatively, the measurement data may also be transmitted from the functional units 10 to a receiving unit of the user device 2 directly via a wireless interface.

In a further possible embodiment, the system 1 according to the invention can provide location-specific functions. In one possible variant embodiment, the user device 2 can determine the current location thereof using a GPS receiver. In a further possible variant embodiment, the switch cabinet 9 also has a GPS receiver for determining the location thereof. In a further possible variant embodiment, the operator or assembler U1 on site is assisted as a function of the determined location of the switch cabinet 9 and/or of the user device 2. For example, if the switch cabinet 9 and/or the assembler U1 are located in Brazil, the information or the information data supplied to him are preferably supplied in the national language, namely Portuguese, by the central computer 7 of the manufacturer 7. The user or assembler thus receives additional information and/or instructions in the national language with which he is familiar.

Further, various functional units 10 or replacement functional units 11 are only usable in particular countries or states, for example because of the operating frequency of the power network there. For example, the operating frequency 1 of the power network in Europe is 50 Hz, whilst the operating frequency f of the power network in the USA is 60 Hz. As a location requirement, a replacement functional unit 11 has to be suitable or configured for the operating frequency of the power network used at the location. In a preferred embodiment, when replacement functional units 11 are selected for functional units 10 which are to be replaced, for example which are defective, location coordinates of the switch cabinet 9, in other words the country in which the switch cabinet 9 in question is located, are therefore taken into account. For example, if a switch cabinet 9 is located in a state A and a functional unit 10-*i* has to be replaced, for example a replacement functional unit 11-*i* suitable for this state is automatically selected, and not a replacement functional unit unsuitable for this state. In a further possible variant embodiment, particular functions provided by the functional units 10 and/or replacement functional units 11 for checking the functional unit of the electric circuit are automatically triggered, for example a start-stop measurement. Further, during the maintenance or assembly process, error messages and/or warning messages may be supplied to the assembler U1 as additional information. For example, if the system detects that a switch cabinet 9 has not yet been selected, the assembler U1 located on site can be warned that the switch cabinet 9 has not yet been switched off.

Further embodiments of the configuration system 1 according to the invention are possible. In one possible variant embodiment, the switch cabinet 9 of a system operator is connected to a local database of the system operator. In one possible embodiment, in the local database of the system operator there are data models and/or datasets, which technically describe the various functional units 10 connected in the switch cabinet 9 of the system operator and in particular comprise identification data and technical data for describing technical properties of the functional units 10 and/or of the associated switch cabinet 9. In one possible embodiment, the configuration unit 4 has access via a data network to the local database of the system operator or customer. The additional information stored in the local database of the system operator can be taken into account by the configuration unit 4 when the functional units 10 mounted in the switch cabinet 9 are being replaced with replacement functional units 11.

In a further possible embodiment, the assembler 5A who is manually carrying out the replacement process at the switch cabinet 9 may wear special gloves which have markers M which are detected by the detection unit 3 or camera 3. In this way, the assembler U1 can visually track, using the display of the 3D glasses 5A, the position where his hands are currently located relative to the functional units 10 of the projected circuit diagram during the assembly process. For example, the assembler U1 shown in FIG. 4 can recognize that his right hand is located directly in front of the functional unit 10C of the circuit diagram. In this way, assembler U1 can be prevented from mixing up the functional units 10 during the assembly process. Further, in one possible embodiment, the technical expert U2 can detect, by means of the markers M applied to the gloves, which functional units 10 of the electric circuit are actually being set or handled by the assembler U1 on site. In this way, it is possible for the remote technician U2 of the manufacturer to give the assembler U1 acting on site targeted instructions or assistance.

In a further aspect, the invention thus provides an assembly kit for assembling or reconfiguration in a switch cabinet 9, for which an assembler U1 wears a camera 3, for example mounted on a helmet of the assembler, as a detection unit. As well as the camera, 3, the assembler wears 3D glasses comprising a display 5A. Further, the special assembly kit comprises gloves comprising markings or markers M which can be detected by the camera 3 during the assembly process.

The detection unit 3 of the configuration system serves to detect objects, in particular functional units, within the switch cabinet 9. The detection unit 3 supplies data to the configuration unit 4. In one possible embodiment, further data sources which are evaluated during the detection of objects or functional units are present in addition to the detection unit 3. In one possible embodiment, circuit diagrams, parts lists, construction data, in particular electric diagram data, and further image data are additionally evaluated.

In existing switch cabinets, functional units from various manufacturers may have been installed. In these cases, in particular parts lists may simplify recognition of the functional units assembled within the switch cabinet. In one possible embodiment, the parts lists, the circuit diagram and further construction data of the installed functional units may be read in via a data interface.

The configuration system according to the invention makes possible exact identification and tracking of components or functional units. In one possible embodiment, tracking methods using active and passive markers may be used. Preferably, in an alternative embodiment, marker-free tracking methods are used, since the use of markers such as QR codes or RFID tags does allow simplified identification of components or functional units, but has the drawback that retrofitting on the components or functional units is required. In addition, during the operation of a machine, markers can create soiling or for example fall off as a result of vibrations. For this reason, in a preferred embodiment of the configuration system according to the invention, an image recognition method is used, and identifies known components or functional units without the use of markers in an industrial field of application, in particular in an automated manner by machine learning.

So as to make comprehensive object detection and identification possible in an industrial context, the object recognition is preferably expanded with a virtual object data model. This object data model integrates a geometric representation of the physical properties and of meta-data associated with the object so as to provide an application-specific data model which can be used virtually. A geometric representation may for example be determined from construction data of products or functional units. For example non-uniform rational B splines (NURBS), which can be generated by 3D CAD systems, may be used as construction data. Unlike polygon-based object representations, NURBS data models make exact geometric representation of objects possible by way of defined curves and surfaces. The additional information available by way of the object model makes it possible to identify individual components of a system by mapping to the stored virtual component model or object data model.

In one possible embodiment, the configured or reconfigured circuit generated by the configuration system 1 may be projected onto a projection surface by means of a marker. This marker is for example a sticker or the like provided in the switch cabinet. By means of the configuration system according to the invention, it is also possible to configure a switch cabinet in a targeted manner on the basis of customer specifications. The configuration system according to the invention can be used by various users, for example in advising system operators, in system planning or in maintaining or repairing systems.

In one possible embodiment, the configuration system or the configurator may be linked to an application which is implemented for example on a mobile telephone. As a result, configuration in a customer environment, for example the configuration of a switch cabinet of a customer, can be simulated by the configuration system. For this purpose, global coordinates for the loaded 3D objects and the positions thereof in space can be transmitted. After the app or application is started up, in one embodiment components, functional units or modules are detected automatically in an augmented reality (AR) mode. For example, a module or functional unit installed in the switch cabinet may be selected, the selected functional unit being reordered automatically for example. For example, the interior of a switch cabinet is displayed on a display of a mobile telephone. The user can for example selected a component or functional unit displayed on a display, for example by tapping a finger on the displayed component in question.

In a further possible embodiment, particular measurement data may be read out from a selected component or a selected functional unit installed within the switch cabinet and analyzed by the calculation unit. In this case, the measurement data are preferably read out wirelessly, for example by NFC or Bluetooth. For example, particular measurement data of the functional unit may be statistically evaluated, and the evaluation results may be displayed on a display of the mobile telephone.

In a further possible embodiment, a component or functional unit detected as being defective can be reported. If for example a component or a functional unit is detected as being defective, using measurement data or otherwise, a user can for example hold a camera of the mobile telephone in front of the defective component and report the defective component displayed on the display of the mobile telephone by tapping a finger on the displayed defective component and thus triggering a corresponding message to the system.

The components or functional units installed in the switch cabinet can be scanned using augmented reality detection or image detection and additionally or alternatively using Bluetooth or NFC. In one possible embodiment, the system can detect possible errors or defects by means of active data matching with a database. In one possible embodiment, measurement data read out from the functional units and/or the switch cabinet are additionally evaluated for this purpose. In one possible embodiment, a switch cabinet layout can be called from a customer database via the Internet. Further, customer configurations or for example stored quotations can be called. These data can be evaluated in addition to detecting the modules or functional units installed within a switch cabinet. In one possible embodiment, further data or information concerning industrial devices or components or functional units may be provided on the basis of a decentralized knowledge base, which is maintained by the users of the system.

LIST OF REFERENCE NUMERALS

1 Configuration system
2 User device
3 Detection unit
4 Configuration unit
5 Output unit
5A, 5B Output unit
6 Network
7 Server
8 Database
9 Switch cabinet
10 Functional unit
11 Replacement functional unit
12 Data memory
13 Data memory
14 Switch cabinet control system

The invention claimed is:

1. A configuration system for reconfiguring a switch cabinet comprising: (a) a detection unit which detects functional units of an electric circuit, wherein the functional units are mounted within the switch cabinet, the detection unit configured and operable to detect said functional units by way of characteristic features of the functional units, which have unambiguous identification features which are read out by the detection unit; (b) a configuration unit which contains a processor, the processor configured and operable to; i) determine an electric circuit diagram of the electric circuit based on the detected functional units of the electric circuit which are detected by way of the characteristic features, the electric circuit diagram including representations of the detected functional units; and ii) automatically replace the representation of one or more of the detected functional units of in the determined electric circuit diagram with a representation of an associated one of the replacement functional units which is stored in a database; and (c) an output unit for outputting the representation of the replacement functional units.

2. The configuration system according to claim 1, wherein the configuration unit has access, via a first interface, to the database, which stores the functional units and the associated replacement functional units as well as the switch cabinet comprising various types of switch cabinets.

3. The configuration system according to claim 1, wherein the detection unit is configured and operable to automatically detect the functional unit, mounted within the switch cabinet, of the electric circuit by way of at least one the characteristic features of the functional unit, which comprises at least one the unambiguous identification features of the functional unit which is read out by the detection unit and an external design feature of the functional unit.

4. The configuration system according to claim 1, wherein the detection unit is configured and operable to automatically detect a type of the switch cabinet by way of a characteristic feature of the switch cabinet.

5. The configuration system according to claim 1, wherein the configuration unit is configured and operable to automatically replace the representations of the detected functional units of in the determined electric circuit diagram with the representations of the associated replacement functional units at least in part to correct errors in and/or to optimize the switch cabinet in terms of at least one predetermined optimization criterion.

6. The configuration system according to claim 5, wherein the at least one predetermined optimization criterion used in the automatic optimization comprises: a required installation space of the replacement functional units within the switch cabinet, a development of heat by the replacement functional units within the switch cabinet, a dissipation of the heat by the replacement functional units, whether the replacement functional units meet a predetermined certification requirement and/or whether the replacement functional units meet predetermined performance requirements.

7. The configuration system according to claim 1, wherein the configuration unit has access, via a second interface, to data memories of the functional units mounted in the switch cabinet and/or to a data memory of the switch cabinet, the data memory of a respective one the functional units comprising identification data for identifying the functional unit in question and/or technical data for describing technical properties of the functional unit in question and/or slate data for describing a current state of the functional unit in question and/or measurement data generated by the functional unit in question, the data memory of the switch cabinet storing identification data for identifying the switch cabinet in question, technical data for describing technical properties of the switch cabinet in question, state data for describing a current state of the electric circuit implemented in the switch cabinet and/or measurement data generated by at least one the functional units generated in the switch cabinet.

8. The configuration system according to claim 1, wherein the detection unit, the configuration unit and the output unit are integrated into a portable user device.

9. The configuration system according to claim 8, wherein the user device includes a wireless interface for reading out data from data memories of the functional units mounted in the switch cabinet and/or from a data memory of the switch cabinet.

10. The configuration system according to claim 1, wherein the detection unit includes at least one sensor for optically detecting the functional units mounted within the switch cabinet, which supplies images of the mounted functional units to the configuration unit of the configuration system.

11. The configuration system according to claim 10, wherein the configuration unit comprises a calculation unit configured and operable to automatically calculate geometric dimensions of and/or distances between the functional units mounted within the switch cabinet on the basis of the images, obtained by the detection unit, of the functional units mounted within the switch cabinet, the geometric dimensions and/or distances being evaluated in the optimization of the circuit mounted within the switch cabinet in terms of an optimization criterion of installation space.

12. The configuration system according to claim 1, wherein the output unit of the configuration system has a display which shows the replacement functional units together with the non-replaced detected functional units, projected in a virtually mounted state in the switch cabinet.

13. Configuration system according to claim 8, wherein the portable user device has three-dimensional glasses, comprising a display, as the output unit.

14. The configuration system according to claim 1, wherein the functional units which are detected as being defective using measurement data which are read out are selected and automatically replaced.

15. A switch cabinet comprising the functional units mounted therein, which each have at least one the characteristic features which is detectable by the detection unit of the configuration system according to claim 1 for configuring the switch cabinet.

16. The switch cabinet according to claim 15, wherein the switch cabinet has at least one characteristic feature which is detectable by the detection unit of the configuration system for automatically determining a type of the switch cabinet.

17. The switch cabinet according to claim 15, wherein the switch cabinet has conductor rails and/or support rails on which various ones of the functional units of the electric circuit are mounted, the functional units of the switch cabinet comprising: at least some functional units for supplying power to other of the functional units of the switch cabinet or devices connected to the switch cabinet, at least some functional units for ventilating or cooling units of other of the functional units or the devices connected to the switch cabinet, the at least some functional units for distributing power to other of the functional units of the switch cabinet or the devices connected to the switch cabinet, the at least some functional units for electrically protecting other of the functional units of the switch cabinet or the devices connected to the switch cabinet, the at least some functional units for generating measurement data of other of the functional units of the switch cabinet or the devices connected to the switch cabinet, the at least some functional units for monitoring other of the functional units of the switch cabinet or the devices connected to the switch cabinet, the at least some functional units for controlling or regulating other of the functional units of the switch cabinet or the devices connected to the switch cabinet, the at least some functional units for protecting other of the functional units of the switch cabinet against fire or explosions or for protecting the devices connected to the switch cabinet, and/or other of the functional units for frequency inversion.

* * * * *